(12) United States Patent
Je et al.

(10) Patent No.: US 11,203,361 B2
(45) Date of Patent: Dec. 21, 2021

(54) METHOD FOR PERFORMING ON-DEVICE LEARNING OF MACHINE LEARNING NETWORK ON AUTONOMOUS VEHICLE BY USING MULTI-STAGE LEARNING WITH ADAPTIVE HYPER-PARAMETER SETS AND DEVICE USING THE SAME

(71) Applicant: Stradvision, Inc., Pohang-si (KR)

(72) Inventors: Hongmo Je, Pohang-si (KR);
Yongjoong Kim, Pohang-si (KR);
Dongkyu Yu, Pohang-si (KR); Sung An Gweon, Seoul (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 17/229,350

(22) Filed: Apr. 13, 2021

(65) Prior Publication Data

US 2021/0347379 A1 Nov. 11, 2021

Related U.S. Application Data

(60) Provisional application No. 63/020,101, filed on May 5, 2020.

(51) Int. Cl.
*B60W 60/00* (2020.01)
*G06K 9/62* (2006.01)
*G06N 20/00* (2019.01)

(52) U.S. Cl.
CPC ......... *B60W 60/001* (2020.02); *G06K 9/6257* (2013.01); *G06N 20/00* (2019.01)

(58) Field of Classification Search
USPC ......................................................... 701/23
See application file for complete search history.

(56) References Cited

U.S. PATENT DOCUMENTS

2009/0306866 A1\* 12/2009 Malikopoulos ... B60W 30/1882
701/59
2018/0018524 A1\* 1/2018 Yao ..................... G06K 9/00362
(Continued)

OTHER PUBLICATIONS

Wistuba Martin et al: "Learning hyperparameter optimization initializations", IEEE International Conference on Data Science and Advanced Analytics (DSAA), 10/192015, p. 1-10.
(Continued)

*Primary Examiner* — Tyler D Paige
(74) *Attorney, Agent, or Firm* — Gable Gotwals

(57) ABSTRACT

A method for performing on-device learning of embedded machine learning network of autonomous vehicle by using multi-stage learning with adaptive hyper-parameter sets is provided. The processes include: (a) dividing the current learning into a 1-st stage learning to an n-th stage learning, assigning 1-st stage training data to n-th stage training data, generating a 1_1-st hyper-parameter set candidate to a 1_h-th hyper-parameter set candidate, training the embedded machine learning network in the 1-st stage learning, and determining a 1-st adaptive hyper-parameter set; (b) generating a k_1-st hyper-parameter set candidate to a k_h-th hyper-parameter set candidate, training the (k−1)-th stage-completed machine learning network in the k-th stage learning, and determining a k-th adaptive hyper-parameter set; and (c) generating an n-th adaptive hyper-parameter set, and executing the n-th stage learning, to thereby complete the current learning.

14 Claims, 4 Drawing Sheets

(56) References Cited

U.S. PATENT DOCUMENTS

| | | | |
|---|---|---|---|
| 2019/0049963 A1* | 2/2019 | Palanisamy | G05D 1/0088 |
| 2019/0101914 A1* | 4/2019 | Coleman, II | G08G 1/0129 |
| 2019/0171912 A1* | 6/2019 | Vallespi-Gonzalez | G06K 9/6282 |
| 2019/0219998 A1* | 7/2019 | Harihara Subramanian | G09G 5/00 |
| 2020/0042896 A1* | 2/2020 | Ko | G06F 17/15 |

OTHER PUBLICATIONS

Ahmad El Sallab et al: "Meta learning Framework for Automated Driving", Cornell University Library, 201 OLIN Library Cornell University Ithaca, NY 14853, Jun. 11, 2017.

\* cited by examiner

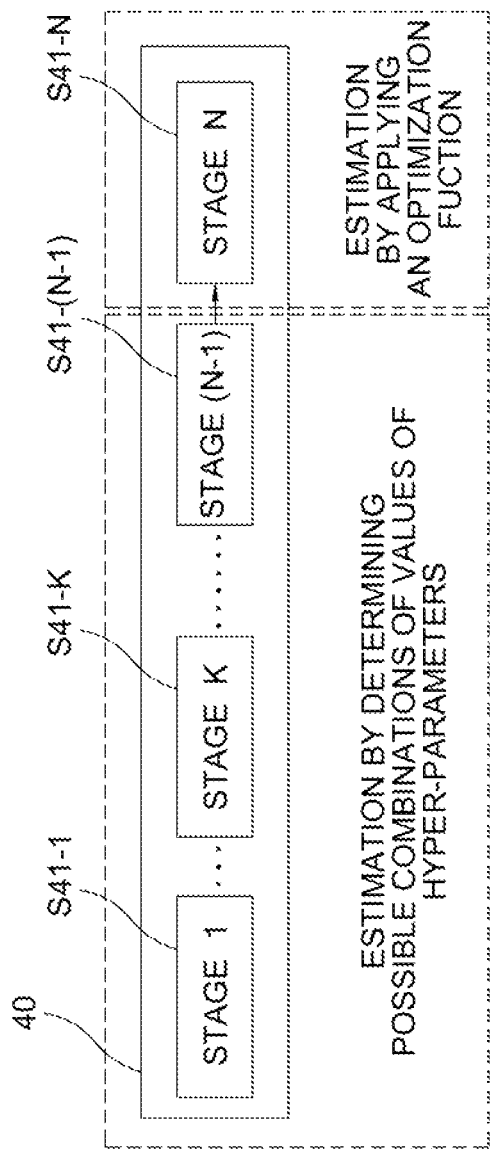

METHOD FOR PERFORMING ON-DEVICE LEARNING OF MACHINE LEARNING NETWORK ON AUTONOMOUS VEHICLE BY USING MULTI-STAGE LEARNING WITH ADAPTIVE HYPER-PARAMETER SETS AND DEVICE USING THE SAME

CROSS REFERENCE TO RELATED APPLICATION

This application claims the benefit of priority to U.S. Provisional Patent Application No. 63/020,101, filed on May 5, 2020, the entire contents of which being incorporated herein by reference.

FIELD OF THE DISCLOSURE

The present disclosure relates to a method for performing on-device learning of a machine learning network of an autonomous vehicle by using a multi-stage learning with adaptive hyper-parameter sets and a device using the same; and more particularly, to the method for performing on-device learning for the machine learning network by using the multi-stage learning with the adaptive hyper-parameter sets on a whole system installed in the autonomous vehicle, and the device using the same.

BACKGROUND OF THE DISCLOSURE

In order to adapt a machine learning network of an autonomous vehicle to a new driving environment, it is needed to re-train the machine learning network by using new data acquired from sensors equipped with the autonomous vehicle, such as a camera, a radar, or a LIDAR, etc.

However, it is difficult for the machine learning network to annotate newly acquired raw data on an embedded system installed in the autonomous vehicle. Thus, as a solution, a method for training the machine learning network using a training data set comprised of previous training data and new training data is considered.

As a conventional method, an on-device training technology may transfer data to be used for training the machine learning network of the autonomous vehicle from the vehicle to a cloud server by using an Over-The-Air (OTA) technology, train the machine learning network on a server-side through the cloud server, and then transfer only the trained machine learning network back to the vehicle.

However, the conventional on-device learning method using the OTA technology has disadvantages of slow update cycle and limited accessibility when the OTA connection with the cloud server is restricted.

Thus, a technology is needed which trains the machine learning model with a limited computing power of the embedded system on the autonomous vehicle without connecting to the cloud server.

SUMMARY OF THE DISCLOSURE

It is an object of the present disclosure to solve all the aforementioned problems.

It is another object of the present disclosure to provide a method for increasing a performance level of an embedded machine learning network of an autonomous vehicle with a computing power of the autonomous vehicle through a multi-stage learning, i.e., an on-device learning.

It is still another object of the present disclosure to provide a method for improving the performance of the embedded machine learning network by using adaptive hyper-parameter sets generated from the multi-stage learning, instead of using fixed hyper-parameters.

It is still yet another object of the present disclosure to provide a method of updating the embedded machine learning network to the machine learning network with an improved performance within a period relatively shorter than the time required for acquiring a best model of the machine learning network by using the cloud server with the OTA connection.

In order to accomplish the objects above, distinctive structures of the present disclosure are described as follows.

In accordance with one aspect of the present disclosure, there is provided a method for performing on-device learning of embedded machine learning network of the autonomous vehicle by using the multi-stage learning with the adaptive hyper-parameter sets, including steps of: (a) an on-device learning device, if new training data being acquired for a current learning from the autonomous vehicle satisfy at least one of learning conditions, performing or supporting another device to perform processes of (i) dividing the current learning into a 1-st stage learning to an n-th stage learning by referring to an initial hyper-parameter set, wherein n is an integer bigger than or equal to 2, and assigning 1-st stage training data to n-th stage training data, selected from the new training data and previous training data, respectively to the 1-st stage learning to an n-th stage learning, wherein the previous training data were used for executing at least one previous learning, (ii) generating a 1_1-st hyper-parameter set candidate to a 1_h-th hyper-parameter set candidate, wherein h is an integer bigger than or equal to 2, by determining possible combinations acquired from each of 1-st candidate values within each of preset ranges from each of initial values of hyper-parameters included in the initial hyper-parameter set, (iii) training the embedded machine learning network with each of the initial hyper-parameter set and the 1_1-st hyper-parameter set candidate to the 1_h-th hyper-parameter set candidate by using the 1-st stage training data during the 1-st stage learning, and estimating each level of performance, in the 1-st stage learning, of the embedded machine learning network for each of the initial hyper-parameter set and the 1_1-st hyper-parameter set candidate to the 1_h-th hyper-parameter set candidate, to thereby determine the embedded machine learning network with a highest level of performance thereamong as a 1-st stage-completed machine learning network, and (iv) determining a hyper-parameter set included in the 1-st stage-completed machine learning network as a 1-st adaptive hyper-parameter set; (b) the on-device learning device, as increasing k from 2 to (n−1), performing or supporting another device to perform processes of (i) generating a k_1-st hyper-parameter set candidate to a k_h-th hyper-parameter set candidate, by determining possible combinations acquired from each of k-th candidate values within each of preset ranges from each of (k−1)-th adaptive values of hyper-parameters included in a (k−1)-th adaptive hyper-parameter set, (ii) training the (k−1)-th stage-completed machine learning network with each of the (k−1)-th adaptive hyper-parameter set and the k_1-st hyper-parameter set candidate to the k_h-th hyper-parameter set candidate by using k-th stage training data during the k-th stage learning, and estimating each level of performance, in the k-th stage learning, of the (k−1)-th stage-completed machine learning network for each of the (k−1) adaptive hyper-parameter set and the k_1-st hyper-parameter set candidate to the k_h-th hyper-parameter set candidate, to thereby determine the (k−1)-th stage-completed machine learning network with a highest level of performance thereamong as a k-th stage-completed machine learning network, and (iii) determining a hyper-parameter set included in the k-th stage-completed machine learning network as a k-th adaptive hyper-parameter set; and (c) the on-device learning device, performing or supporting another device to perform processes of (i) generating an n-th adaptive hyper-parameter set by applying an optimization function, wherein the optimization function is determined by referring to (i-1) each of the 1-st adaptive hyper-parameter set to an (n−1)-th adaptive hyper-parameter set, and (i-2) each performance of the 1-st stage-completed machine learning network to an (n−1)-th stage-completed machine learning network, and (ii) executing the n-th stage learning by training the (n−1)-th stage-completed machine learning network using the n-th adaptive hyper-parameter set and the n-th stage training data, to thereby complete the current learning.

As one example, the method further including a step of: (d) the on-device learning device, (i) if the level of performance of an n-th stage-completed machine learning network is not increased larger than a threshold, performing or supporting another device to perform processes of preventing an update of the embedded machine learning network to the n-th stage-completed machine learning network and then allowing the autonomous vehicle to acquire additional new training data for a next learning until the additional new training data satisfy at least one of the learning conditions, and (ii) if the level of performance of the n-th stage-completed machine learning network is increased larger than the threshold, performing or supporting another device to perform processes of executing the update of the embedded machine learning network to the n-th stage learning-completed machine learning network and then allowing the autonomous vehicle to acquire the additional new training data for the next learning until the additional new training data satisfy at least one of the learning conditions.

As one example, if the level of performance of the k-th stage-completed machine learning network is determined as higher than the level of performance of the (k−1)-th stage-completed machine learning network, the on-device learning device performs or supports another device to perform a process of determining each of a (k+1)-th adaptive hyper-parameter set to the n-th adaptive hyper-parameter set to be the k-th adaptive hyper-parameter set.

As one example, at the step of (b), the on-device learning device performs or supports another device a process of setting at least two adaptive values of at least two hyper-parameters included in the 1-st adaptive hyper-parameter set to the n-th adaptive hyper-parameter set to have a same adaptive value. As one example, if the level of performance of the k-th stage-completed machine learning network is determined as higher than the level of performance of the (k−1)-th stage-completed machine learning network, the on-device learning device performs or supports another device to perform a process of setting the k-th stage learning as the n-th stage learning, to thereby complete the current learning.

As one example, at the step of (a), the on-device learning device, if sensing data are acquired by one or more sensors mounted on the autonomous vehicle and output data corresponding to the sensing data are generated by the embedded machine learning network, performs or supports another device to perform processes of inputting the sensing data and its corresponding output data into a data selection network, to thereby allow the data selection network to select specific sensing data to be used for training the embedded machine learning network by referring to the output data, and storing the specific sensing data as the new training data.

As one example, the hyper-parameter set includes at least one of parameter of learning algorithm, size of mini-batch, maximum number of stages, and maximum epoch per stage.

As one example, at the step of (a), the on-device learning device performs or supports another device to perform a process of determining the initial hyper-parameter set to be a pre-defined hyper-parameter set for a base model of the embedded machine learning network, or determining the initial hyper-parameter set to be a best hyper-parameter set of the embedded machine learning network having completed the previous learning.

In accordance with another aspect of the present disclosure, there is provided an on-device learning device for performing on-device learning of embedded machine learning network of autonomous vehicle by using multi-stage learning with adaptive hyper-parameter sets, including: at least one memory that stores instructions; and at least one processor configured to execute the instructions to perform or support another device to perform: (I) if new training data being acquired for a current learning from the autonomous vehicle satisfy at least one of learning conditions, (i) a process of dividing the current learning into a 1-st stage learning to an n-th stage learning by referring to an initial hyper-parameter set, wherein n is an integer bigger than or equal to 2, and assigning 1-st stage training data to n-th stage training data, selected from the new training data and previous training data, respectively to the 1-st stage learning to an n-th stage learning, wherein the previous training data were used for executing at least one previous learning, (ii) a process of generating a 1_1-st hyper-parameter set candidate to a 1_h-th hyper-parameter set candidate, wherein h is an integer bigger than or equal to 2, by determining possible combinations acquired from each of 1-st candidate values within each of preset ranges from each of initial values of hyper-parameters included in the initial hyper-parameter set, (iii) a process of training the embedded machine learning network with each of the initial hyper-parameter set and the 1_1-st hyper-parameter set candidate to the 1_h-th hyper-parameter set candidate by using the 1-st stage training data during the 1-st stage learning, and estimating each level of performance, in the 1-st stage learning, of the embedded machine learning network for each of the initial hyper-parameter set and the 1_1-st hyper-parameter set candidate to the 1_h-th hyper-parameter set candidate, to thereby determine the embedded machine learning network with a highest level of performance thereamong as a 1-st stage-completed machine learning network, and (iv) a process of determining a hyper-parameter set included in the 1-st stage-completed machine learning network as a 1-st adaptive hyper-parameter set, (II) as increasing k from 2 to (n−1), (i) a process of generating a k_1-st hyper-parameter set candidate to a k_h-th hyper-parameter set candidate, by determining possible combinations acquired from each of k-th candidate values within each of preset ranges from each of (k−1)-th adaptive values of hyper-parameters included in a (k−1)-th adaptive hyper-parameter set, (ii) a process of training the (k−1)-th stage-completed machine learning network with each of the (k−1)-th adaptive hyper-parameter set and the k_1-st hyper-parameter set candidate to the k_h-th hyper-parameter set candidate by using k-th stage training data during the k-th stage learning, and estimating each level of performance, in the k-th stage learning, of the (k−1)-th stage-completed machine learning network for each of the (k−1) adaptive hyper-parameter set and the k_1-st hyperparameter set candidate to the k_h-th hyper-parameter set candidate, to thereby determine the (k−1)-th stage-completed machine learning network with a highest level of performance thereamong as a k-th stage-completed machine learning network, and (iii) a process of determining a hyper-parameter set included in the k-th stage-completed machine learning network as a k-th adaptive hyper-parameter set, and (III) (i) a process of generating an n-th adaptive hyper-parameter set by applying an optimization function, wherein the optimization function is determined by referring to (i-1) each of the 1-st adaptive hyper-parameter set to an (n−1)-th adaptive hyper-parameter set, and (i-2) each performance of the 1-st stage-completed machine learning network to an (n−1)-th stage-completed machine learning network, and (ii) a process of executing the n-th stage learning by training the (n−1)-th stage-completed machine learning network using the n-th adaptive hyper-parameter set and the n-th stage training data, to thereby complete the current learning.

As one example, the processor further performs or supports another device to perform: (IV) (i) if the level of performance of an n-th stage-completed machine learning network is not increased larger than a threshold, a process of preventing an update of the embedded machine learning network to the n-th stage-completed machine learning network and then allowing the autonomous vehicle to acquire additional new training data for a next learning until the additional new training data satisfy at least one of the learning conditions, and (ii) if the level of performance of the n-th stage-completed machine learning network is increased larger than the threshold, a process of executing the update of the embedded machine learning network to the n-th stage learning-completed machine learning network and then a process of allowing the autonomous vehicle to acquire the additional new training data for the next learning until the additional new training data satisfy at least one of the learning conditions.

As one example, if the level of performance of the k-th stage-completed machine learning network is determined as higher than the level of performance of the (k−1)-th stage-completed machine learning network, the processor performs or supports another device to perform a process of determining each of a (k+1)-th adaptive hyper-parameter set to the n-th adaptive hyper-parameter set to be the k-th adaptive hyper-parameter set.

As one example, at the process of (II), the processor performs or supports another device a process of setting at least two adaptive values of at least two hyper-parameters included in the 1-st adaptive hyper-parameter set to the n-th adaptive hyper-parameter set to have a same adaptive value.

As one example, if the level of performance of the k-th stage-completed machine learning network is determined as higher than the level of performance of the (k−1)-th stage-completed machine learning network, the processor performs or supports another device to perform a process of setting the k-th stage learning as the n-th stage learning, to thereby complete the current learning.

As one example, at the process of (I), if sensing data are acquired by one or more sensors mounted on the autonomous vehicle and output data corresponding to the sensing data are generated by the embedded machine learning network, the processor performs or supports another device to perform a process of inputting the sensing data and its corresponding output data into a data selection network, to thereby allow the data selection network to select specific sensing data to be used for training the embedded machine learning network by referring to the output data, and a process of storing the specific sensing data as the new training data.

As one example, the hyper-parameter set includes at least one of parameter of learning algorithm, size of mini-batch, maximum number of stages, and maximum epoch per stage.

As one example, at the process of (I), the processor performs or supports another device to perform a process of determining the initial hyper-parameter set to be a predefined hyper-parameter set for a base model of the embedded machine learning network, or a process of determining the initial hyper-parameter set to be a best hyper-parameter set of the embedded machine learning network having completed the previous learning.

In addition, recordable media readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 4 is a drawing schematically illustrating a process of the multi-stage learning of the embedded machine learning network on the autonomous vehicle using each of the adaptive hyper-parameter sets generated from each of stage learnings in accordance with one example embodiment of the present disclosure.

DETAILED DESCRIPTION OF THE PREFERRED EMBODIMENTS

Figure 1:
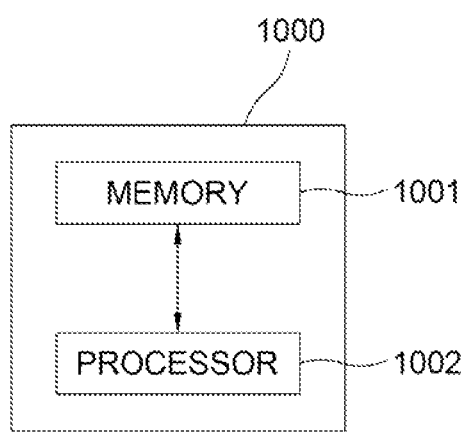
FIG. 1 is a drawing schematically illustrating the on-device learning device for training the embedded machine learning network of the autonomous vehicle by using the multi-stage learning with the adaptive hyper-parameter sets in accordance with one example embodiment of the present disclosure.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

The headings and abstract of the present disclosure provided herein are for convenience only and do not limit or interpret the scope or meaning of the embodiments.

Herein, the remaining description of the present disclosure may refer to the 'autonomous vehicle' as 'vehicle' for the convenience of explanation.

Herein, the remaining description of the present disclosure may refer to a 'embedded machine learning network' as a machine learning network, a 1-st stage-completed machine learning network, a (k−1)-th stage-completed machine learning network, a k-th stage-completed machine learning network, an (n−1)-th stage-completed machine learning network, or an n-th stage-completed machine learning network for conveniently explaining the 'embedded machine learning network' of the present disclosure being trained in different stages.

To allow those skilled in the art to carry out the present disclosure easily, the example embodiments of the present disclosure by referring to attached diagrams will be explained in detail as shown below.

FIG. 1 is a drawing schematically illustrating the on-device learning device for training the embedded machine learning network of the autonomous vehicle by using the multi-stage learning with the adaptive hyper-parameter sets in accordance with one example embodiment of the present disclosure.

By referring to FIG. 1, the on-device learning device 1000 may include a memory 1001 which stores one or more instructions for performing the on-device learning of the embedded machine learning network of the autonomous vehicle by using the multi-stage learning with the adaptive hyper-parameter sets, and a processor 1002 which performs functions for the on-device learning of the embedded machine learning network of the autonomous vehicle by using the multi-stage learning with adaptive hyper-parameter sets in response to the instructions stored in the memory 1001.

Specifically, the on-device learning device 1000 may typically achieve a required system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Additionally, the processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, the case in which the computing device includes an integrated processor, integrating a medium, a processor and a memory, for implementing the present disclosure is not excluded.

Meanwhile, a method of the on-device learning device 1000 for training the embedded machine learning network 500 by using the multi-stage learning with the adaptive hyper-parameter sets is explained below by referring to FIG. 2 to FIG. 4 in accordance with one example embodiment of the present disclosure.

Figure 2:
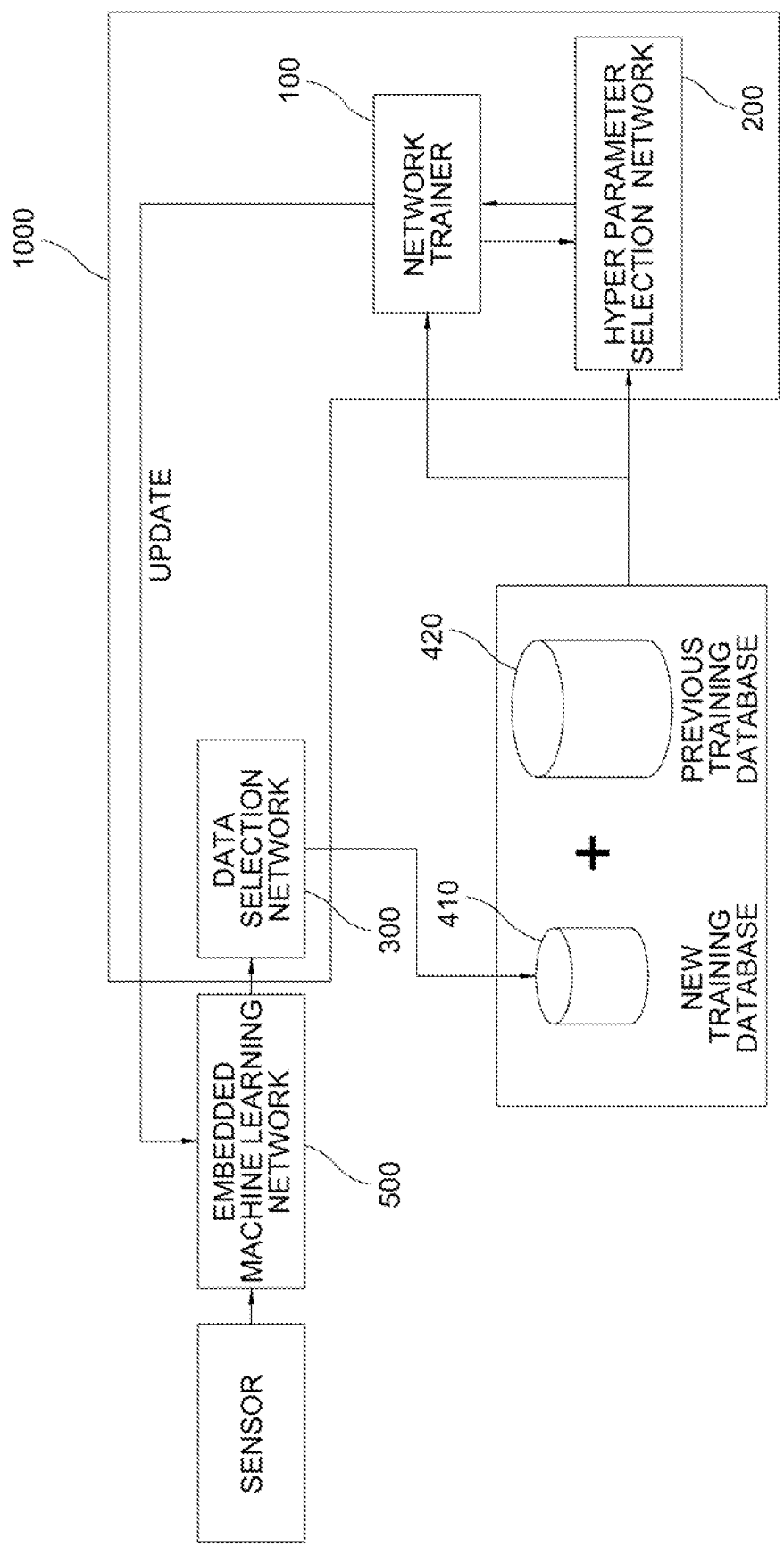
FIG. 2 is a drawing schematically illustrating a method for the on-device learning of the embedded machine learning network of the autonomous vehicle by using the multi-stage learning with the adaptive hyper-parameter sets in accordance with one example embodiment of the present disclosure.

By referring to FIG. 2, during an autonomous driving of the vehicle, if sensing data are acquired by one or more sensors mounted on the autonomous vehicle, the embedded machine learning network 500 of the autonomous vehicle performs or supports another device to perform processes of (i) inputting the sensing data into the embedded machine learning network 500, to thereby allow the embedded machine learning network 500 to generate output data corresponding to the sensing data and (ii) allowing the vehicle to continue on autonomously driving by referring to the output data. Herein, the output data includes information related to surrounding driving environment of the autonomous vehicle generated by analyzing the sensing data based on deep learning technology.

Herein, the sensors may include a camera, a LiDAR, a radar, etc., or combinations thereof. Also, the sensing data may include information on the driving environment related to any area corresponding to a specific range of viewing angles captured by the sensors or may include information of driving environment related to entire surroundings of the sensors. And the sensing data may be a video or image photographed around the vehicle or information on driving environment captured from various sensors equipped with the vehicle but the present disclosure is not limited thereto, and various types of data acquired by the sensors while the vehicle is driven may be considered.

Meanwhile, the embedded machine learning network 500 may be configured as a perception-based learning network, such as a deep learning network, and the embedded machine learning network 500 may include, an object detector, a classification network, or a segmentation network, etc., capable of outputting information related to the driving environments e.g., object information, and lane information, near the autonomous vehicle being driven, generated by analyzing the sensing data such as videos or images. But the present disclosure is not limited thereto and the embedded machine learning network 500 may include various kinds of networks e.g., behavior prediction or risk detection, capable of performing various tasks for supporting the autonomous driving of the vehicle.

During the autonomous driving of the vehicle, the on-device learning device 1000 performs or supports another device to perform processes of (i) selecting specific sensing data to be used for training the embedded machine learning network by referring to the output data, and (ii) storing the specific sensing data as the new training data. Herein, the selected specific sensing data are determined as having a degree of usefulness larger than a pre-determined usefulness among the sensing data for improving a performance of the embedded machine learning network 500 of the autonomous vehicle against the driving environment where the autonomous vehicle repetitively drives or newly drives by referring to the sensing data and its corresponding output, and stored as new training data in a new training database 410. Herein, determining the degree of usefulness the specific sensing data can be proceeded by identifying whether the specific sensing data are determined as hard samples or not.

For example, if the embedded machine learning network 500 is configured as an object detector having a convolutional neural network for identifying and classifying objects related to the driving environment, the specific training data to be used for training the embedded machine learning network 500 can be selected by referring to each distribution of classification probabilities for each of objects detected from the sensing data.

Specifically, if some of the classification probabilities are lower than a preset probability, the corresponding sensing data may be classified as hard samples, which represents that the corresponding sensing data satisfy a condition of the hard samples related to the degree of usefulness. Herein, the hard samples refer to the sensing data that the embedded machine learning network 500 considers them as difficult to learn. And then, the specific sensing data classified as the hard samples can be stored as the new training data in the new training database 410, however, the present disclosure is not limited to thereto, and various methods of selecting the specific sensing data to be used for improving the performance of the embedded machine learning network 500 can be considered.

Meanwhile, the aforementioned processes describe that the on-device learning device 1000 selects the specific training data determined as having the degree of usefulness larger than the predetermined usefulness for training the embedded machine learning network 500 by referring to the output data. However, as another example, the on-device learning device 1000 may input the sensing data and its corresponding output data of the embedded machine learning network 500 into a data selection network 300 configured as the deep learning based network, and then instruct the data selection network 300 to select the specific sensing data that are considered as useful for training the embedded machine learning network 500 by referring to the output data.

Next, if new training data being acquired from the autonomous vehicle satisfy at least one of learning conditions, e.g., a preset duration or a preset data volume, etc., the on-device learning device 1000 performs or supports another device, e.g., a hyper-parameter selection network 200 of the on-device learning device 1000, to perform processes of dividing a current learning into a 1-st stage learning to an n-th stage learning by referring to an initial hyper-parameter set of the embedded machine learning network 500. Herein, n is an integer bigger than or equal to 2.

Figure 3:
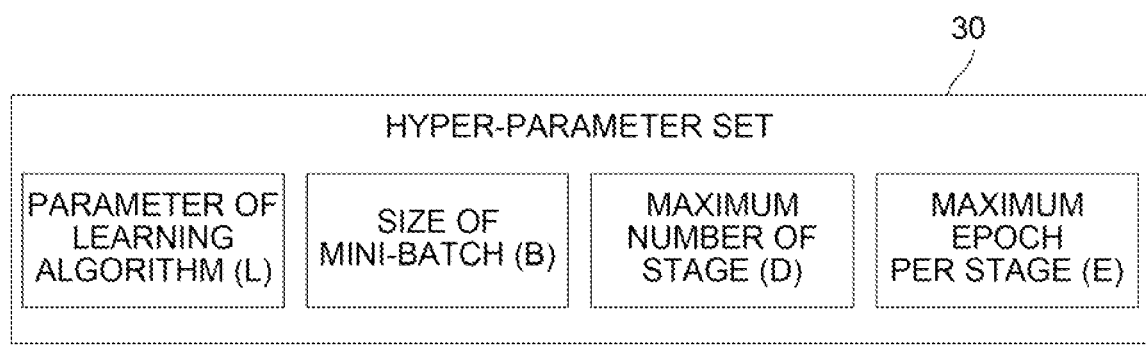
FIG. 3 is a drawing schematically illustrating a configuration of a hyper-parameter set in accordance with one example embodiment of the present disclosure.

Meanwhile, a configuration of a hyper-parameter set 30 is explained by referring to FIG. 3. According to FIG. 3, the hyper-parameter set 30 may include at least one of parameter of learning algorithm L, size of mini-batch B, maximum number of stages D, and maximum epochs per stage E, however, the present disclosure is not limited thereto, and various configurations or combinations of hyper-parameters can be included in the hyper-parameter set 30. Also, the parameter of learning algorithm L may include information on a category for selecting an optimizer of learning algorithm, such as SGD, Adam, AdaGrad, RMSProp, etc., and information on another category for learning algorithm parameters including additional parameters, such as learning rate, weight decay, momentum, damping, etc.

Meanwhile, the on-device learning device 1000 or the hyper-parameter selection network 200 of the on-device learning device 1000 may determine the initial hyper-parameter set by referring to initial values of the hyper-parameter set pre-defined for acquiring a base model of the embedded machine learning network 500. Herein, the base model refers to a model of the embedded machine learning network 500 at a time of release or a time of factory reset. In the case, the initial hyper-parameter set may be represented as below.

$$H_{init} = \{L_{pre}, B_{pre}, D_{pre}, E_{pre}\}$$

Herein, each of $L_{pre}$, $B_{pre}$, $D_{pre}$ and $E_{pre}$ is corresponding to each of initial values for each of hyper-parameters, L, B, D, and E included in the initial hyper-parameter set.

Alternatively, the on-device learning device 1000 or the hyper-parameter selection network 200 of the on-device learning device 1000 may determine the initial hyper-parameter set by referring to best values of the hyper-parameter set used for acquiring a best model of the embedded machine learning network 500 having completed a previous learning. In the case, the initial hyper-parameter set may be represented as below.

$$H_{init} = \{L_{best}, B_{best}, D_{best}, E_{best}\}$$

Herein, each of $L_{best}$, $B_{best}$, $D_{best}$ and $E_{best}$ is corresponding to each of best values for each of hyper-parameters, L, B, D, and E assigned to the embedded machine learning network 500 determined as having a best performance among performances achieved in the course of the previous learning.

Herein, if L is at least one of the additional parameters, the initial value of L may be set as a small number close to 0 in general, and the initial values of L, B, D and E may be set according to a size of the new training data or a computing power of the on-device learning device 1000.

By referring to FIG. 2, the on-device learning device 1000 performs processes of (i) generating a training data set to be used for the current learning by sampling the new training data stored in the new training database 410 and previous training data stored in a previous training database 420 and (ii) assigning the training data set to 1-st stage training data to n-th stage training data, respectively for the 1-st stage learning to an n-th stage learning. Herein, the previous training data were used for executing at least one previous learning.

Alternatively, the on-device learning device 1000 may perform or support another device, e.g., a network trainer 100 of the on-device learning device 1000, to perform processes of generating each of training data sets for each of stage learnings separately and assigning each of the training data sets respectively to each of the 1-st stage learning to the n-th stage learning.

Meanwhile, the on-device learning device 1000 or the network trainer 100 of the on-device learning device 1000 may perform the process of generating the training data set at any time during the current learning, or depending on a case, at several points of time during the current learning, however, it is not limited thereto.

Also, the previous training data were already labeled with ground truth since the previous training data were used for training the base model or the previous model of the embedded machine learning network 500, and the new training data may have not been labeled yet with any ground truth. For annotating the new training data that are unlabeled, a process of labeling the ground truth, e.g., labeling a class, may be performed through a separately configured auto-labeling network, or through manual labeling. Also, semi-supervised learning can be performed by using the labeled previous training data and the unlabeled new training data.

Furthermore, on-device learning device 1000 performs or supports another device, e.g., the hyper-parameter selection network 200, to perform a process of generating a 1_1-st hyper-parameter set candidate to a 1_h-th hyper-parameter set candidate by determining possible combinations acquired from each of 1-st candidate values within each of preset ranges from each of initial values of hyper-parameters included in the initial hyper-parameter set, wherein h is an integer bigger than or equal to 2.

For example, on-device learning device 1000 or the hyper-parameter selection network 200 of the on-device learning device 1000 may generate the initial hyper-parameter set by using the initial values of the pre-defied hyper-parameters for the base model of the machine learning network 500. In this case, the initial hyperparameter set is represented as below.

$$H_{init} = \{L_{pre}, B_{pre}, D_{pre}, E_{pre}\} = \{0.1_{pre}, 5_{pre}, 5_{pre}, 10_{pre}\}$$

Herein, the on-device learning device 1000 or the hyper-parameter selection network 200 of the on-device learning device 1000 may determine the 1-st candidate values within each of preset ranges from each of the initial values of each of the hyper-parameters. In specific, $L_1$ may represent a set of 1-st candidate values of the hyper-parameter L determined by referring to the initial value of $L_{pre}$. For example, $L_1$ can be determined by using the candidate values included within a preset range of ±0.02 from the initial value 0.1 of $L_{pre}$ and represented as $L_1 = \{0.12, 0.11, 0.09, 0.08\}$. In this case, each of 1-st candidate values of each of the hyper-parameters may be configured as $L_1 = \{0.12, 0.11, 0.09, 0.08\}$, $B_1 = \{7, 6, 4, 3\}$, $D_1 = \{8, 7, 6, 4, 3, 2\}$ and $E_1 = \{6, 8, 12, 14\}$, and each preset range for each the hyper-parameter can be determined differently beforehand. Next, the on-device learning device 1000 or the hyper-parameter selection network 200 of the on-device learning device 1000 may generate the 1_1-st hyper-parameter set candidate to the 1_h-th hyper-parameter set candidate by determining the possible combinations acquired from each of the 1-st candidate values without repetition. For example, the 1_1-st hyper parameter set candidate to the 1_h-th hyper-parameter set candidate can be generated by using the aforementioned 1-st candidate values. In the case, examples of the possible combinations of the 1_1-st hyper parameter set candidate to the 1_h-th hyper-parameter set candidate can be represented as $H_{1\_1can} = \{0.12, 7, 8, 6\}$ to $H_{1\_hcan} = \{0.08, 3, 2, 14\}$.

As another example, the on-device learning device 1000 or the hyper-parameter selection network 200 of the on-device learning device 1000 may also generate the 1_1-st hyper-parameter set candidate to the 1_h-th hyper-parameter set candidate by randomly selecting a number of the hyper-parameter set candidates among all of the hyper-parameter set candidates generated by determining all of the possible combinations using each of the 1-st candidate values.

Thereafter, the on-device learning device 1000 performs or supports another device to perform a process of training the embedded machine learning network 500 with each of the initial hyper-parameter set and the 1_1-st hyper-parameter set candidate to the 1_h-th hyper-parameter set candidate by using the 1-st stage training data during the 1-st stage learning.

For example, the on-device learning device 1000 may instruct the hyper-parameter selection network 200 to transmit the initial hyper-parameter set and the 1_1-st hyper-parameter set candidate to the 1_h-th hyper-parameter set candidate to the network trainer 100. And, the on-device learning device 1000 may instruct the network trainer 100 to train the embedded machine learning network 500 with each of the initial hyper-parameter set and the 1_1-st hyper-parameter set candidate to the 1_h-th hyper-parameter set candidate by using the 1-st stage training data.

Also, the on-device learning device 1000 may instruct the hyper-parameter selection network 200 to transmit the initial hyper-parameter set and the 1_1-st hyper-parameter set candidate to the 1_h-th hyper-parameter set candidate sequentially to the network trainer 100, to thereby allow the network trainer 100 to train the embedded machine learning network 500 sequentially with the initial hyper-parameter set and the 1_1-st hyper-parameter set candidate to the 1_h-th hyper-parameter set candidate.

That is, the on-device learning device 1000 may instruct the hyper-parameter selection network 200 to transmit the initial hyper-parameter set to the network trainer 100, to thereby allow the network trainer 100 to train the embedded machine learning network 500 with the initial hyper-parameter set by using the 1-th stage training data, and then the on-device learning device 1000 may instruct the hyper-parameter selection network 200 to transmit the 1_1-st hyper-parameter set to the network trainer 100, to thereby allow the network trainer 100 to train the machine learning network 500 with the 1_1-st hyper-parameter set by using the 1-st stage training data. Next, the on-device learning device 1000 may instruct the hyper-parameter selection network 200 to transmit a 1_2-nd hyper-parameter set to the 1_h-th hyper-parameter set sequentially to the network trainer 100, and instruct the network trainer 100 to train the embedded machine learning network 500 with 1_2-nd hyper parameter set to the 1_h-th hyper-parameter set by using the 1-st stage training data in sequence as aforementioned processes.

Moreover, the on-device learning device 1000 performs or supports another device to perform processes of estimating each level of performance, in the 1-st stage learning, of the embedded machine learning network 500 for each of the initial hyper-parameter set and the 1_1-st hyper-parameter set candidate to the 1_h-th hyper-parameter set candidate, to thereby determine the embedded machine learning network 500 with a highest level of performance thereamong as a 1-st stage-completed machine learning network 500, and determining a hyper-parameter set included in the 1-st stage-completed machine learning network 500 as a 1-st adaptive hyper-parameter set.

For example, the on-device learning device 1000 may instruct the network trainer 100 to transmit each of estimation results on each of levels of performance of the embedded machine learning network 500, for each of the initial hyper-parameter set and the 1_1-st hyper-parameter set candidate to the 1_h-th hyper-parameter set candidate, to the hyper-parameter selection network 200. Herein, each of the estimations has been generated by performing cross-validation using each of validation data. And the on-device learning device 1000 may instruct the hyper-parameter selection network 200 to determine the embedded machine learning network 500 having a highest level of performance thereamong based on the estimation results on the levels of performance generated by performing the cross-validation, and determine the embedded machine learning network 500 having the highest level of performance as a 1-st stage-completed machine learning network 500. Furthermore a hyper-parameter set included in the 1-st stage-completed machine learning network is determined as a 1-st adaptive hyper-parameter set.

Accordingly, the on-device learning device 1000 completes the 1-st stage learning and starts its next stage learning, i.e., a 2-nd stage learning, by referring to the 1-st adaptive hyper-parameter set.

After completing the 1-st stage learning, the on-device learning device 1000, as increasing k from 2 to (n−1), performs or supports another device to perform a process of generating a k_1-st hyper-parameter set candidate to a k_h-th hyper-parameter set candidate, by determining possible combinations acquired from each of k-th candidate values within each of preset ranges from each of (k−1)-th adaptive values of hyper-parameters included in a (k−1)-th adaptive hyper-parameter set. Herein, each adaptive value is each value of each hyper-parameter included in the adaptive hyper-parameter set.

Next, the on-device learning device 1000 performs or supports another device to perform processes of training the (k−1)-th stage-completed machine learning network 500 with each of the (k−1)-th adaptive hyper-parameter set and the k_1-st hyper-parameter set candidate to the k_h-th hyper-parameter set candidate by using k-th stage training data during the k-th stage learning, and estimating each level of performance, in the k-th stage learning, of the (k−1)-th stage-completed machine learning network 500 for each of the (k−1) adaptive hyper-parameter set and the k_1-st hyper-parameter set candidate to the k_h-th hyper-parameter set candidate, to thereby determine the (k−1)-th stage-completed machine learning network 500 with a highest level of performance thereamong as a k-th stage-completed machine learning network 500, and determine a hyper-parameter set included in the k-th stage-completed machine learning network 500 as a k-th adaptive hyper-parameter set.

Meanwhile, the on-device learning device 1000 may repeat aforementioned processes until the 1-st stage learning to the (n−1) stage learning are completed in sequence, and generate the 1-st adaptive hyper-parameter set to the (n−1)-th adaptive hyper-parameter set respectively corresponding to the 1-st stage learning to the (n−1) stage learning. Since processes of performing each stage learning except for the n-th stage learning are same as the aforementioned, recurrent explanations are dispensed with.

Moreover, by referring to FIG. 4, a method of performing the n-th stage learning is explained. According to the FIG. 4, if the 1-th stage learning S41-1 to the (n−1)-th stage learning S41-(N−1) have been completed, the on-device learning device 1000 performs or supports the hyper-parameter selection network 200 to perform a process of generating an n-th adaptive hyper-parameter set by applying an optimization function. Herein, the optimization function is determined by referring to each of the 1-st adaptive hyper-parameter set to an (n−1)-th adaptive hyper-parameter set and by further referring to each performance of the 1-st stage-completed machine learning network 500 to an (n−1)-th stage-completed machine learning network 500.

For example, the on-device learning device 1000 may instruct the hyper-parameter selection network 200 to generate the n-th adaptive hyper-parameter set by referring to the 1-st stage learning S41-1 to the (n−1)-th stage learning S41-(N−1) such that the n-th adaptive hyper-parameter set is expected to output a highest performance level when used for training the (n−1)-th stage-completed machine learning network 500 compared to the performance level of the embedded machine learning network 500 having completed the previous learning.

Herein, the optimization function may include at least one surrogate model and at least one acquisition function for generating the n-th adaptive hyper-parameter set. Herein, the n-th adaptive hyper-parameter set may be generated using each of optimal values of each of the hyper-parameters generated by operating the optimization function.

Next, the on-device learning device 1000 performs or supports another device, e.g., the network trainer 100 of the on-device learning device 1000, to perform a process of executing the n-th stage learning S41-N by training the (n−1)-th stage-completed machine learning network 500 using the n-th adaptive hyper-parameter set and the n-th stage training data, to thereby complete the current learning.

Herein, a status of completing the n-th stage N41-N is considered as a status of completing the current learning.

In addition, if the level of performance of an n-th stage-completed machine learning network 500 is not increased larger than a threshold, the on-device learning device 1000 performs or supports another device to perform processes of preventing an update of the embedded machine learning network 500 to the n-th stage-completed machine learning network 500 and then allowing the autonomous vehicle to acquire additional new training data for a next learning until the additional new training data satisfy at least one of the learning conditions.

For example, after the current learning has been completed, if the level of performance of the n-th stage-completed machine learning network 500 is not increased larger than the threshold, i.e., if the level of performance of the n-th stage-completed machine learning network 500 is failed to surpass the level of performance of the embedded machine learning network 500 having completed the previous learning, the on-device learning device 1000 may instruct the network trainer 100 to prevent the update of the embedded machine learning network 500 of the autonomous vehicle to the n-th stage-completed machine learning network 500. Then the network trainer 100 may allow the autonomous vehicle to drive by using the embedded machine learning network 500 having completed the previous learning and acquire the additional new training data until the additional new training data satisfy at least one of the learning conditions is satisfied.

Moreover, if the level of performance of the n-th stage-completed machine learning network is increased larger than the threshold, the on-device learning device 1000 performs or supports another device, e.g., the network trainer 100, to perform processes of executing the update of the embedded machine learning network 500 to the n-th stage learning-completed machine learning network 500 and then allowing the autonomous vehicle to acquire the additional new training data for the next learning until the additional new training data satisfy at least one of the learning conditions.

Herein, for updating the embedded machine learning network 500 of the autonomous vehicle, the on-device learning machine 1000 or the network trainer 200 of the on-device learning machine 1000 may determine a version of the embedded machine learning network 500 of the autonomous vehicle as the n-th stage-completed machine learning network 500 or determine the parameter of learning algorithm of the embedded machine learning network 500 of the autonomous vehicle as the parameter of learning algorithm used for training the n-th stage-completed machine learning network 500, however the present disclosure is not limited thereto.

As another example, if the level of performance of the k-th stage-completed machine learning network 500 is determined as higher than the level of performance of the (k−1)-th stage-completed machine learning network 500, the on-device learning device 1000 performs or supports another device to perform a process of determining each of a (k+1)-th adaptive hyper-parameter set to the n-th adaptive hyper-parameter set to be the k-th adaptive hyper-parameter set.

As still another example, if the level of performance of the k-th stage-completed machine learning network 500 is determined as higher than the level of performance of the (k−1)-th stage-completed machine learning network 500, the on-device learning device 1000 performs or supports another device to perform processes of setting the k-th stage learning as the n-th stage learning, to thereby complete the current learning, and then allowing the autonomous vehicle to acquire the additional new training data until the additional new training data satisfy at least one of the learning conditions is satisfied.

That is, if the level of performance of the k-th stage-completed machine learning network 500 is determined as higher than the level of performance of the (k−1)-th stage-completed machine learning network 500, the on-device learning device 1000 performs or supports another device to prevent the on-device learning device 1000 from proceeding to next stage learnings. By doing so, the on-device learning device 1000 can complete the n-th stage learning S41-N in relatively shorter period of time and execute the update of the embedded machine learning network 500 without consuming additional computing resources for generating additional adaptive hyper-parameter sets.

As still yet another example, the on-device learning device 1000 performs or supports another device, e.g., the hyper-parameter selection network 200, to perform a process of setting at least two adaptive values of at least two hyper-parameters included in the 1-st adaptive hyper-parameter set to the n-th adaptive hyper-parameter set to have a same adaptive value. In the case, the adaptive value of the hyper-parameter in at least two different adaptive hyper-parameter sets is represented as below.

$$H_{st+1} = H_{st}$$

That is, the on-device learning device 1000 may instruct the hyper-parameter selection network 200 to make at least two adaptive values of each hyper-parameter included in at least two different adaptive hyper-parameter sets identical to each other. For example, if the adaptive value of the hyper-parameter for maximum number of stages D included in the k-th adaptive hyper-parameter set is equal to 10, it means that the maximum number of stages included in the multi-stage learning for training the machine learning network 500 is 10 stages. Herein, the on-device learning device 1000 may instruct the hyper-parameter selection network 200 to make the adaptive values of the hyper-parameter for maximum number of stages D included in the (k+1)-th adaptive hyper-parameter set as 10.

The present disclosure has an effect of providing the method of increasing the performance level of the embedded machine learning network of the autonomous vehicle with the computing power of the autonomous vehicle through the multi-stage learning, i.e., the on-device learning.

The present disclosure has another effect of providing the method of improving the performance of the embedded machine learning network by using adaptive hyper-parameter sets generated from the multi-stage learning, instead of using fixed hyper-parameters.

The present disclosure has still another effect of providing the method of updating the embedded machine learning network to the machine learning network with an improved performance within a period relatively shorter than the time required for acquiring a best model of the machine learning network by using the cloud server with the OTA connection.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for performing on-device learning and updating of an embedded machine learning network capable of performing different types of learning relating to one or more tasks associated with driving an autonomous vehicle; the different types of learning including a perception-based learning network, a behavior prediction network, or a risk detection network; the learning and updating being performed without connecting to a cloud server; the autonomous vehicle configured to collect sensing data for learning about a driving environment and including at least one controller configured to control steering, acceleration, braking, or some combination thereof of the autonomous vehicle; the sensing data including images in proximity to the autonomous vehicle and collected from at least one member or combination of members in communication with the embedded machine learning network, the at least one member being a camera, a radar, or a lidar; wherein a least a portion of the sensing data is training data for the embedded machine learning network; the learning and updating being accomplished by using multi-stage learning with adaptive hyper-parameter sets to generate output data corresponding to the sensing data to allow the autonomous vehicle to continue autonomously driving within the driving environment; the autonomous vehicle further including a learning device in communication with the embedded machine learning network, the embedded machine learning network including at least one of an object detector, a classification network, and a segmentation network and provided with at least a computer device having at least a processor, a memory, a storage, and at least one computer software, the method comprising:

(a) if new training data being acquired for a current learning from the autonomous vehicle satisfy at least one of learning conditions, the learning device, performing or supporting another device to perform processes of:

(i) dividing the current learning into a 1-st stage learning to an n-th stage learning by referring to an initial hyper-parameter set, the initial hyper-parameter set determined by referring to initial values of a hyper-parameter set pre-defined for acquiring a base model of the embedded machine learning network or by a best value of the hyper-parameter set used for acquiring the base model of the embedded machine learning network having completed a previous learning, wherein n is an integer bigger than or equal to 2, and assigning 1-st stage training data to n-th stage training data, selected from the new training data and previous training data, respectively to the 1-st stage learning to an n-th stage learning, wherein the previous training data were used for executing at least one previous learning, (ii) generating a 1_1-st hyper-parameter set candidate to a 1_h-th hyper-parameter set candidate, wherein h is an integer bigger than or equal to 2, by determining possible combinations acquired from each of 1-st candidate values within each of preset ranges from each of initial values of at least one hyper-parameter of a learning algorithm (L), a size of mini-batch (B), a maximum number of stage (D), or a maximum epoch per state (E) included in the initial hyper-parameter set, (iii) training the embedded machine learning network with each of the initial hyper-parameter set and the 1_1-st hyper-parameter set candidate to the 1_h-th hyper-parameter set candidate by using the 1-st stage training data during the 1-st stage learning, and estimating each level of performance, in the 1-st stage learning, of the embedded machine learning network for each of the initial hyper-parameter set and the 1_1-st hyper-parameter set candidate to the 1_h-th hyper-parameter set candidate, to thereby determine the embedded machine learning network with a highest level of performance thereamong as a 1-st stage-completed machine learning network, and (iv) determining a hyper-parameter set of the learning algorithm (L), the size of mini-batch (B), the maximum number of stage (D) and the maximum epoch per stage (E), included in the 1-st stage-completed machine learning network as a 1-st adaptive hyper-parameter set;

(b) the learning device, as increasing k from 2 to (n−1), performing or supporting another device to perform processes of:

(i) generating a k_1-st hyper-parameter set candidate to a k_h-th hyper-parameter set candidate, by determining possible combinations acquired from each of k-th candidate values within each of preset ranges from each of (k−1)-th adaptive values of hyper-parameters included in a (k−1)-th adaptive hyper-parameter set, (ii) training the (k−1)-th stage-completed machine learning network with each of the (k−1)-th adaptive hyper-parameter set and the k_1-st hyper-parameter set candidate to the k_h-th hyper-parameter set candidate by using k-th stage training data during the k-th stage learning, and estimating each level of performance, in the k-th stage learning, of the (k−1)-th stage-completed machine learning network for each of the (k−1) adaptive hyper-parameter set and the k_1-st hyper-parameter set candidate to the k_h-th hyper-parameter set candidate, to thereby determine the (k−1)-th stage-completed machine learning network with a highest level of performance thereamong as a k-th stage-completed machine learning network, and (iii) determining a hyper-parameter set included in the k-th stage-completed machine learning network as a k-th adaptive hyper-parameter set; and (c) the learning device, performing or supporting another device to perform processes of;

(i) generating an n-th adaptive hyper-parameter set by applying an optimization function, wherein the optimization function is determined by referring to (i-1) each of the 1-st adaptive hyper-parameter set to an (n−1)-th adaptive hyper-parameter set, and (i-2) each performance of the 1-st stage-completed machine learning network to an (n−1)-th stage-completed machine learning network, and
(ii) executing the n-th stage learning by training the (n−1)-th stage-completed machine learning network using the n-th adaptive hyper-parameter set and the n-th stage training data, to thereby complete the current learning; and
wherein the current learning is used by controller of the autonomous vehicle to continue autonomously driving within the driving environment or a new driving environment.

2. The method of claim 1, further comprising a step of:
(d) the on-device learning device,
(i) if the level of performance of an n-th stage-completed machine learning network is not increased larger than a threshold, performing or supporting another device to perform processes of preventing an update of the embedded machine learning network to the n-th stage-completed machine learning network and then allowing the autonomous vehicle to acquire additional new training data for a next learning until the additional new training data satisfy at least one of the teaming conditions, and
(ii) if the level of performance of the n-th stage-completed machine learning network is increased larger than the threshold, performing or supporting another device to perform processes of executing the update of the embedded machine learning network to the n-th stage learning-completed machine learning network and then allowing the autonomous vehicle to acquire the additional new training data for the next learning until the additional new training data satisfy at least one of the learning conditions.

3. The method of claim 1, wherein, if the level of performance of the k-th stage-completed machine learning network is determined as higher than the level of performance of the (k−1)-th stage-completed machine learning network, the on-device learning device performs or supports another device to perform a process of determining each of a (k+1)-th adaptive hyper-parameter set to the n-th adaptive hyper-parameter set to be the k-th adaptive hyper-parameter set.

4. The method of claim 1, wherein, at the step of (b), the on-device learning device performs or supports another device a process of setting at least two adaptive values of at least two hyper-parameters included in the 1-st adaptive hyper-parameter set to the n-th adaptive hyper-parameter set to have a same adaptive value.

5. The method of claim 1, wherein, if the level of performance of the k-th stage-completed machine learning network is determined as higher than the level of performance of the (k−1)-th stage-completed machine learning network, the on-device learning device performs or supports another device to perform a process of setting the k-th stage learning as the n-th stage learning, to thereby complete the current learning.

6. The method of claim 1, wherein, at the step of (a), the on-device learning device, if sensing data are acquired by one or more sensors mounted on the autonomous vehicle and output data corresponding to the sensing data are generated by the embedded machine learning network, performs or supports another device to perform processes of inputting the sensing data and its corresponding output data into a data selection network, to thereby allow the data selection network to select specific sensing data to be used for training the embedded machine learning network by referring to the output data, and storing the specific sensing data as the new training data.

7. The method of claim 1, wherein, at the step of (a), the on-device learning device performs or supports another device to perform a process of determining the initial hyper-parameter set to be a pre-defined hyper-parameter set for a base model of the embedded machine learning network, or determining the initial hyper-parameter set to be a best hyper-parameter set of the embedded machine learning network having completed the previous learning.

8. An on-device learning device for performing on-device learning and updating, without connecting to a cloud server, of an embedded machine learning network cable of performing different types of learning relating to one or more tasks associated with driving an autonomous vehicle; the different types of learning including a perception-based learning network, a behavior prediction network, or a risk detection network; the autonomous vehicle configured to collect sensing data for learning about a driving environment and including at least one controller configured to control or some combination thereof of the autonomous vehicle; the sensing data including images in proximity to the autonomous vehicle and collected from at least one member or combination of members in communication with the embedded machine learning network, the at least one member being a camera, a radar, or a lidar; wherein a least a portion of the sensing data is training data for the embedded machine learning network; the learning and updating being accomplished by using multi-stage learning with adaptive hyper-parameter sets, the multi-stage learning with adaptive hyper-parameter sets generating output data corresponding to the sensing data to allow the autonomous vehicle to continue autonomously driving within the driving environment; the autonomous vehicle learning network including a learning device in communication with the embedded machine learning network, the embedded machine learning network including at least one of an object detector, a classification network, and a segmentation network and comprising:
software including instructions,
at least one memory that stores the instructions; and
at least one processor configured to execute the instructions to perform, or support another device to perform the instructions of:
(I) if new training data being acquired for a current learning from the autonomous vehicle satisfy at least one of learning conditions,
(i) a process of dividing the current learning into a 1-st stage learning to an n-th stage learning by referring to an initial hyper-parameter set, the initial hyper-parameter set determined by referring to initial values of a hyper-parameter set pre-defined for acquiring a base model of the embedded machine learning network or by a best value of the hyper-parameter set used for acquiring the base model of the embedded machine learning network having completed a previous learning, wherein n is an integer bigger than or equal to 2, and assigning 1-st stage training data to n-th stage training data, selected from the new training data and previous training data, respectively to the 1-st stage learning to an n-th stage learning, wherein the previous training data were used for executing at least one previous learning,
(ii) a process of generating a 1_1-st hyper-parameter set candidate to a 1_h-th hyper-parameter set candidate, wherein h is an integer bigger than or equal to 2, by determining possible combinations acquired from each of 1-st candidate values within each of preset ranges from each of initial values of hyper-parameters included in the at least one initial hyper-parameter set of parameters of learning algorithm L the size of mini-batch (B) the maximum number of stage (D) and the maximum epoch per stage (E), (iii) a process of training the embedded machine learning network with each of the initial hyper-parameter set and the 1_1-st hyper-parameter set candidate to the 1_h-th hyper-parameter set candidate by using the 1-st stage training data during the 1-st stage teaming, and estimating each level of performance, in the 1-st stage learning, of the embedded machine learning network for each of the initial hyper-parameter set and the 1_1-st hyper-parameter set candidate to the 1_h-th hyper-parameter set candidate, to thereby determine the embedded machine learning network with a highest level of performance thereamong as a 1-st stage-completed machine learning network, and (iv) a process of determining a hyper-parameter set including parameters of learning algorithm (L), the size of mini-batch (B), the maximum number of stage (D) and the maximum epoch per stage (E) included in the 1-st stage-completed machine learning network as a 1-st adaptive hyper-parameter set, (II) as increasing k from 2 to (n−1), (i) a process of generating a k_1-st hyper-parameter set candidate to a k_h-th hyper-parameter set candidate, by determining possible combinations acquired from each of k-th candidate values within each of preset ranges from each of (k−1)-th adaptive values of hyper-parameters included in a (k−1)-th adaptive hyper-parameter set, (ii) a process of training the (k−1)-th stage-completed machine learning network with each of the (k−1)-th adaptive hyper-parameter set and the k_1-st hyper-parameter set candidate to the k_h-th hyper-parameter set candidate by using k-th stage training data during the k-th stage learning, and estimating each level of performance, in the k-th stage learning, of the (k−1)-th stage-completed machine learning network for each of the (k−1) adaptive hyper-parameter set and the k_1-st hyper-parameter set candidate to the k_h-th hyper-parameter set candidate, to thereby determine the (k−1)-th stage-completed machine learning network with a highest level of performance thereamong as a k-th stage-completed machine learning network, and (iii) a process of determining a hyper-parameter set included in the k-th stage-completed machine learning network as a k-th adaptive hyper-parameter set, and (III) (i) a process of generating an n-th adaptive hyper-parameter set by applying an optimization function, wherein the optimization function is determined by referring to (i-1) each of the 1-st adaptive hyper-parameter set to an (n−1)-th adaptive hyper-parameter set, and (i-2) each performance of the 1-st stage-completed machine learning network to an (n−1)-th stage-completed machine learning network, and (ii) a process of executing the n-th stage learning by training the (n−1)-th stage-completed machine learning network using the n-th adaptive hyper-parameter set and the n-th stage training data, to thereby complete the current learning; and wherein the current learning is used by controller of the autonomous vehicle to continue autonomously driving within the driving environment or a new driving environment.

9. The on-device learning device of claim 8, wherein the processor further performs or supports another device to perform:

(IV) (i) if the level of performance of an n-th stage-completed machine learning network is not increased larger than a threshold, a process of preventing an update of the embedded machine learning network to the n-th stage-completed machine learning network and then allowing the autonomous vehicle to acquire additional new training data for a next learning until the additional new training data satisfy at least one of the learning conditions, and (ii) if the level of performance of the n-th stage-completed machine learning network is increased larger than the threshold, a process of executing the update of the embedded machine learning network to the n-th stage learning-completed machine learning network and then a process of allowing the autonomous vehicle to acquire the additional new training data for the next learning until the additional new training data satisfy at least one of the learning conditions.

10. The on-device learning device of claim 8, wherein, if the level of performance of the k-th stage-completed machine learning network is determined as higher than the level of performance of the (k−1)-th stage-completed machine learning network, the processor performs or supports another device to perform a process of determining each of a (k+1)-th adaptive hyper-parameter set to the n-th adaptive hyper-parameter set to be the k-th adaptive hyper-parameter set.

11. The on-device learning device of claim 8, wherein, at the process of (11), the processor performs or supports another device a process of setting at least two adaptive values of at least two hyper-parameters included in the 1-st adaptive hyper-parameter set to the n-th adaptive hyper-parameter set to have a same adaptive value.

12. The on-device learning device of claim 8, wherein, if the level of performance of the k-th stage-completed machine learning network is determined as higher than the level of performance of the (k−1)-th stage-completed machine learning network, the processor performs or supports another device to perform a process of setting the k-th stage learning as the n-th stage learning, to thereby complete the current learning.

13. The on-device learning device of claim 8, wherein, at the process of (1), if sensing data are acquired by one or more sensors mounted on the autonomous vehicle and output data corresponding to the sensing data are generated by the embedded machine learning network, the processor performs or supports another device to perform a process of inputting the sensing data and its corresponding output data into a data selection network, to thereby allow the data selection network to select specific sensing data to be used for training the embedded machine learning network by referring to the output data, and a process of storing the specific sensing data as the new training data.

14. The on-device learning device of claim 8, wherein, at the process of (I), the processor performs or supports another device to perform a process of determining the initial hyper-parameter set to be a pre-defined hyper-parameter set for a base model of the embedded machine learning network, or a process of determining the initial hyper-parameter set to be a best hyper-parameter set of the embedded machine learning network having completed the previous learning.

\* \* \* \* \*